US010865875B2

(12) United States Patent
Kim et al.

(10) Patent No.: US 10,865,875 B2
(45) Date of Patent: Dec. 15, 2020

(54) DIAL SHIFT LEVER DEVICE FOR VEHICLE

(71) Applicant: KYUNG CHANG INDUSTRIAL CO., Ltd., Daegu (KR)

(72) Inventors: Dong Won Kim, Daegu (KR); Yong Soo Kang, Daegu (KR)

(73) Assignee: KYUNG CHANG INDUSTRIAL CO., Ltd.

( * ) Notice: Subject to any disclaimer, the term of this patent is extended or adjusted under 35 U.S.C. 154(b) by 0 days.

(21) Appl. No.: 16/510,154

(22) Filed: Jul. 12, 2019

(65) Prior Publication Data

US 2020/0063857 A1 Feb. 27, 2020

(30) Foreign Application Priority Data

Aug. 21, 2018 (KR) .................. 10-2018-0097258

(51) Int. Cl.
| *F16H 59/08* | (2006.01) |
| *G05G 5/00* | (2006.01) |
| *G05G 5/05* | (2006.01) |
| *G05G 1/015* | (2008.04) |
| *H01H 13/83* | (2006.01) |
| *G05G 1/10* | (2006.01) |

(Continued)

(52) U.S. Cl.
CPC ......... *F16H 59/08* (2013.01); *F16H 59/0278* (2013.01); *G05G 1/015* (2013.01); *G05G 1/10* (2013.01); *G05G 5/005* (2013.01); *G05G 5/05* (2013.01); *H01H 13/72* (2013.01); *H01H 13/83* (2013.01); *B60K 20/02* (2013.01); *F16H 2059/081* (2013.01); *G05G 2505/00* (2013.01); *H01H 2221/01* (2013.01); *H01H 2221/052* (2013.01); *H01H 2225/01* (2013.01)

(58) Field of Classification Search
CPC ................. F16H 59/08; F16H 59/0278; F16H 2059/0282; F16H 2059/0295; F16H 2059/81; F16H 59/12; G05G 1/10; G05G 1/02; G05G 1/025; G05G 2009/04744; H01H 2221/01; H01H 3/004; H01H 2003/028; H01H 3/08; H01H 9/0027; H01H 19/63; H01H 19/6355
See application file for complete search history.

(56) References Cited

U.S. PATENT DOCUMENTS

| 2,826,929 A * | 3/1958 | Lincoln .................. B60K 37/06 74/473.33 |
| 9,291,259 B2 * | 3/2016 | Watanabe ............... F16H 59/08 |
| 2018/0244155 A1 * | 8/2018 | Keenan .................. B60K 37/06 |

FOREIGN PATENT DOCUMENTS

| EP | 1768009 A1 * | 3/2007 | ............. G01D 5/145 |
| KR | 10-2010-0083981 | 7/2010 | |

(Continued)

*Primary Examiner* — Bobby Rushing, Jr.
(74) *Attorney, Agent, or Firm* — The Belles Group, P.C.

(57) ABSTRACT

A dial shift lever device for a vehicle may be provided that includes: a dial knob which is rotatable from a predetermined reference position by a user's operation for changing a shift stage; a button driving part which comprises a plurality of buttons disposed circumferentially in a receiving recess formed in a lower portion of the dial knob and generates a signal for selecting the shift stage as at least one of the plurality of buttons is pressed by rotation of the dial knob; and a guide assembly which is coupled to the lower portion of the dial knob and locks the rotation of the dial knob or releases the lock of the rotation of the dial knob.

11 Claims, 14 Drawing Sheets

(51) Int. Cl.
  *B60K 20/02* (2006.01)
  *F16H 59/02* (2006.01)
  *H01H 13/72* (2006.01)

(56) References Cited

FOREIGN PATENT DOCUMENTS

| KR | 10-2012-0139881 | | 12/2012 | | |
|----|-----------------|---|---------|---|---|
| KR | 10-2015-0112292 | A | 10/2015 | | |
| WO | WO-2018217865 | A1 * | 11/2018 | ............. | F16H 63/48 |

* cited by examiner

【Fig. 1a】
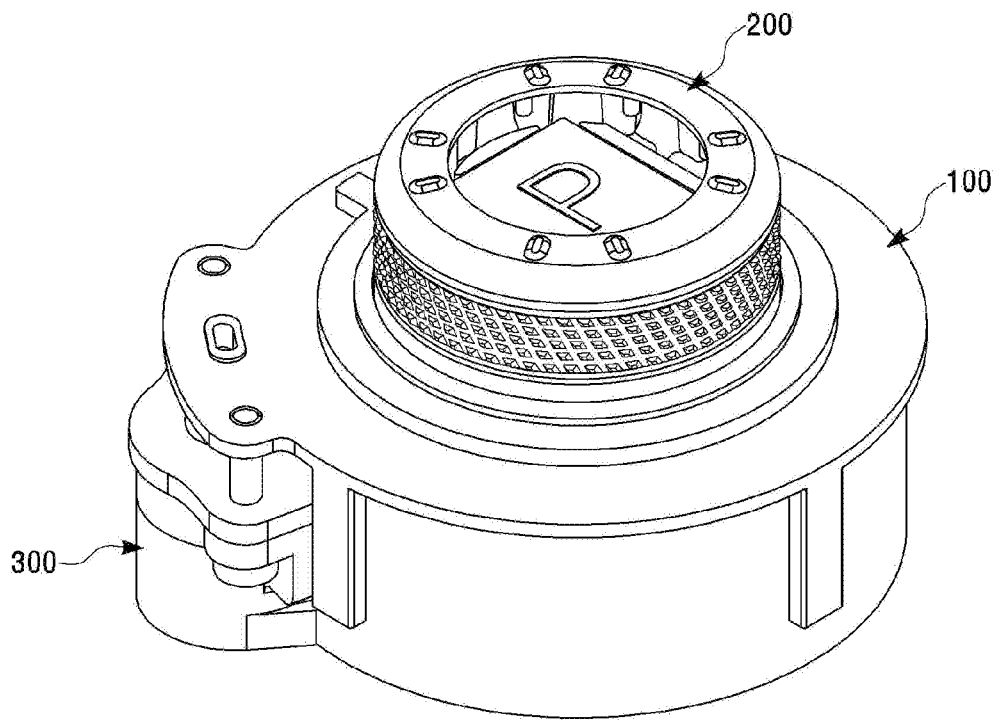
【Fig. 1b】
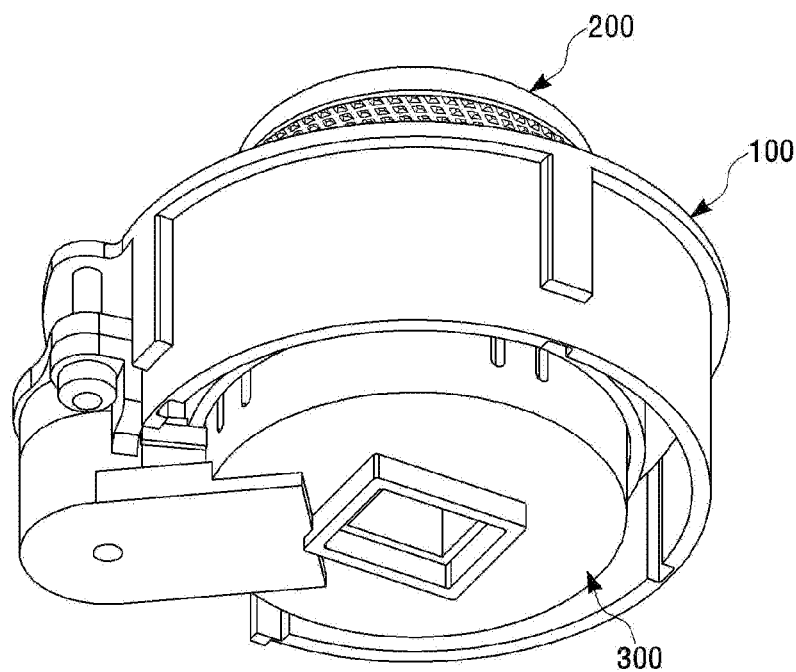

[Fig. 2]
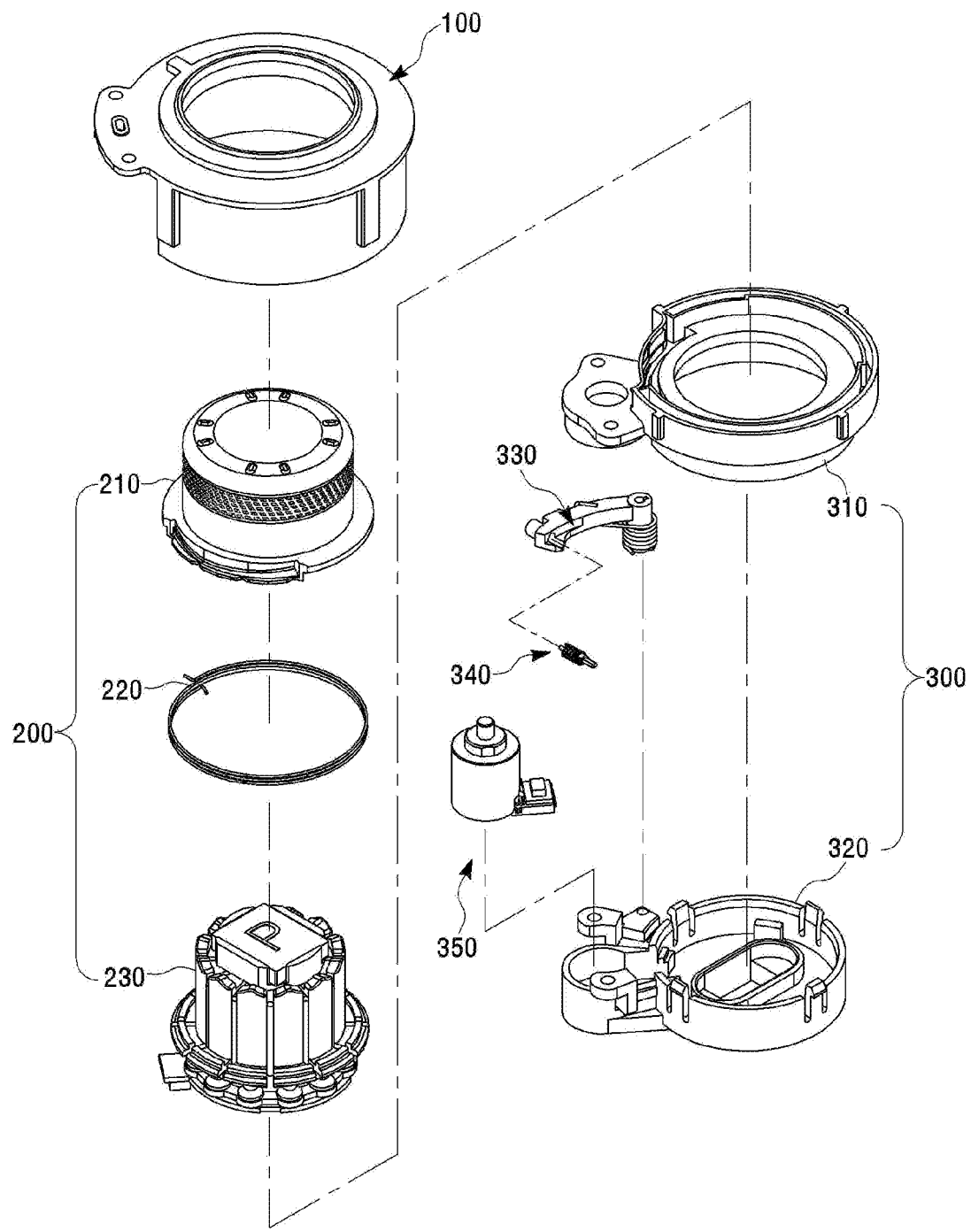

[Fig. 3]
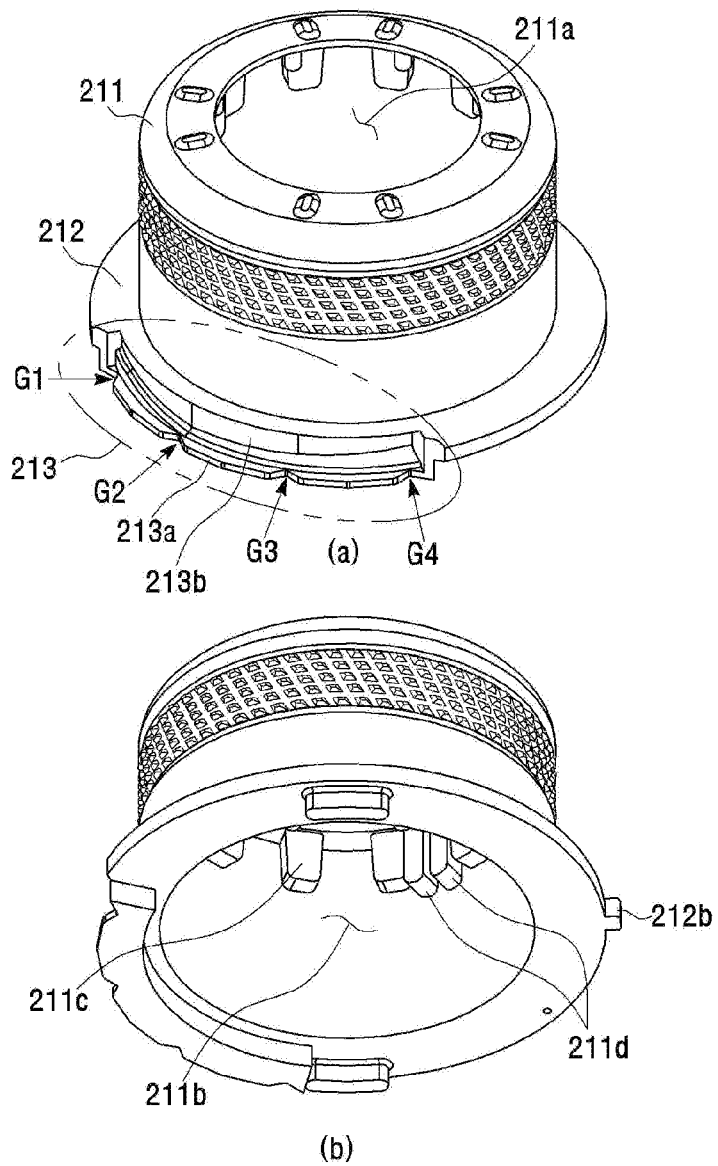

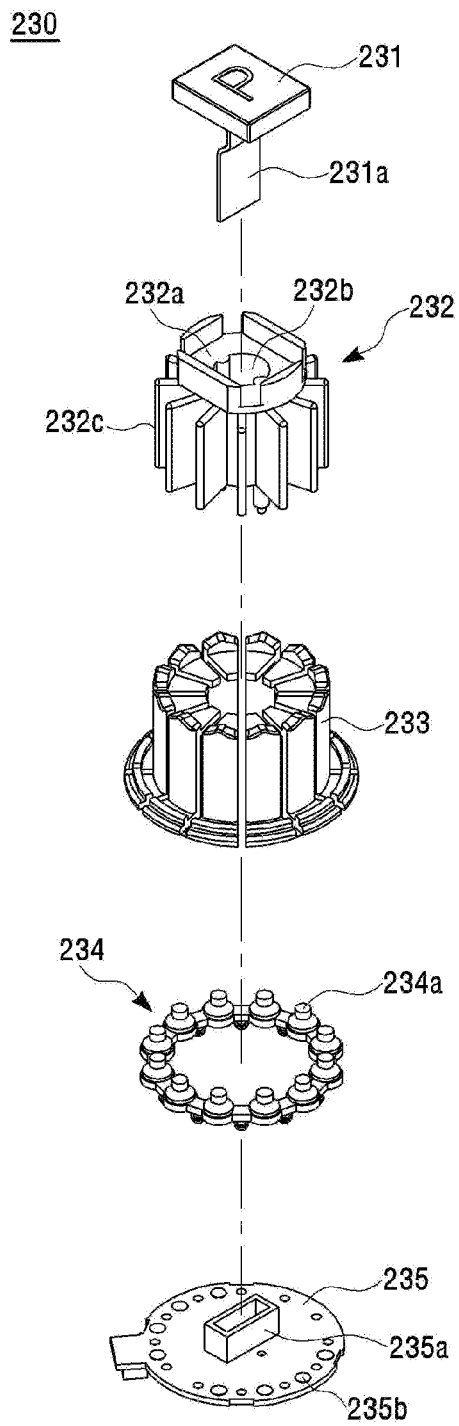
[Fig. 4]

【Fig. 5】
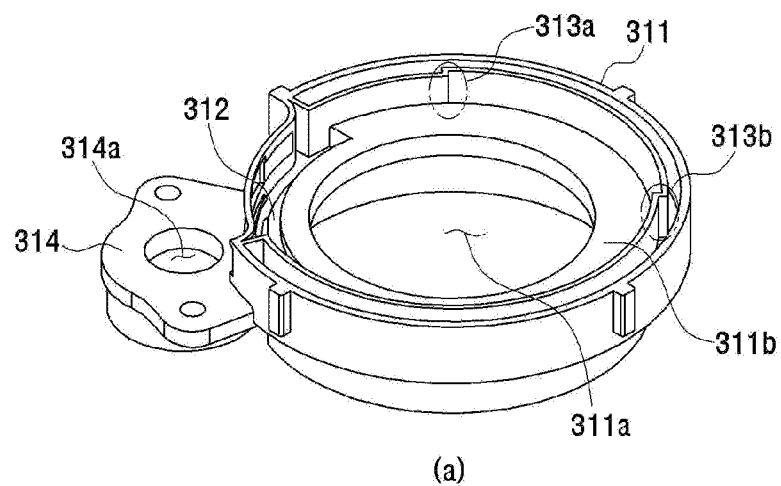
(a)
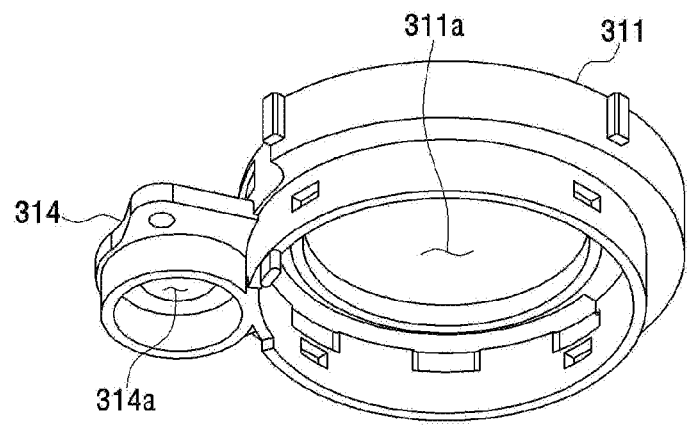
(b)

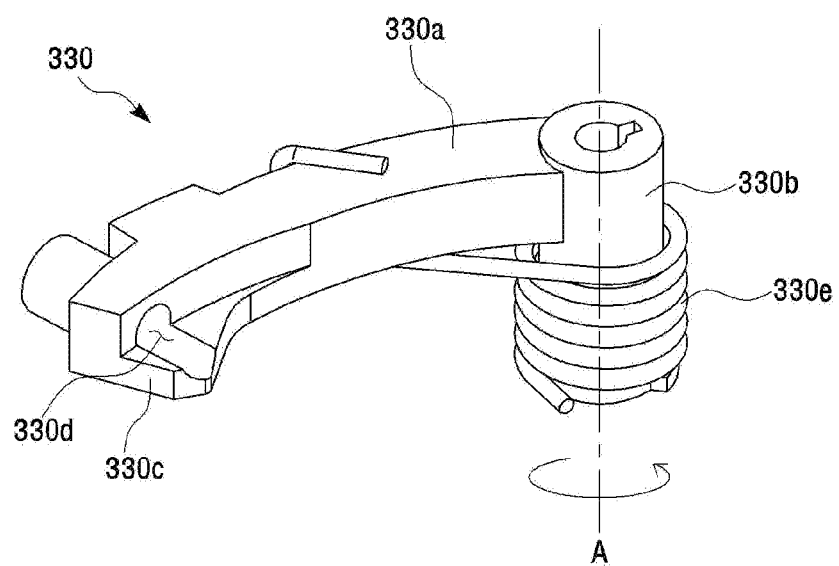

[Fig. 7]
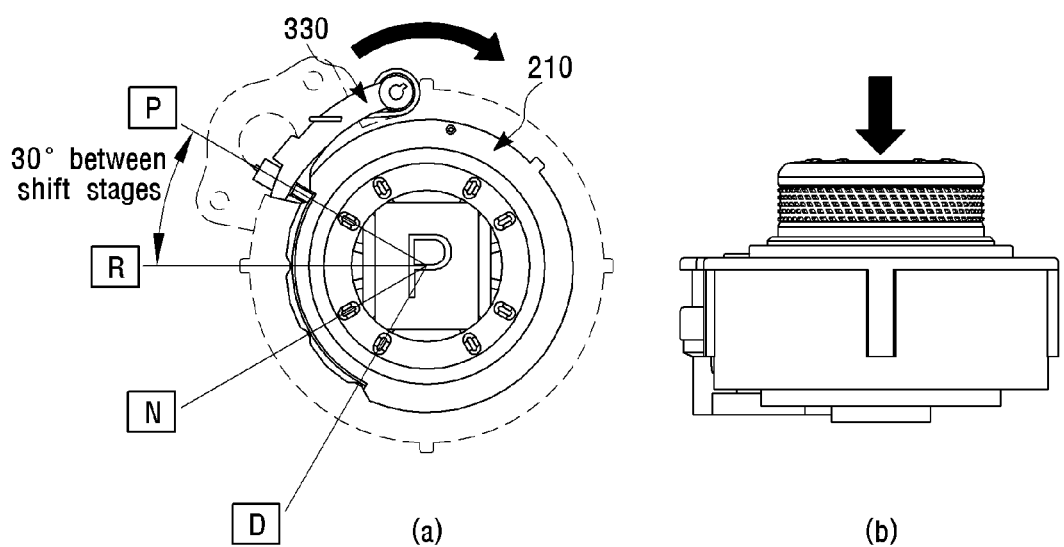
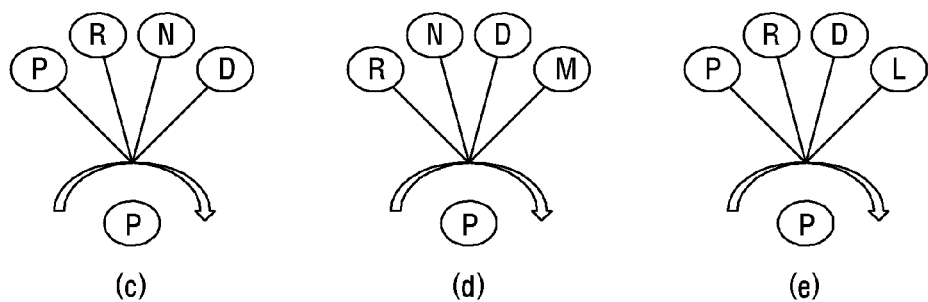

[Fig. 8]
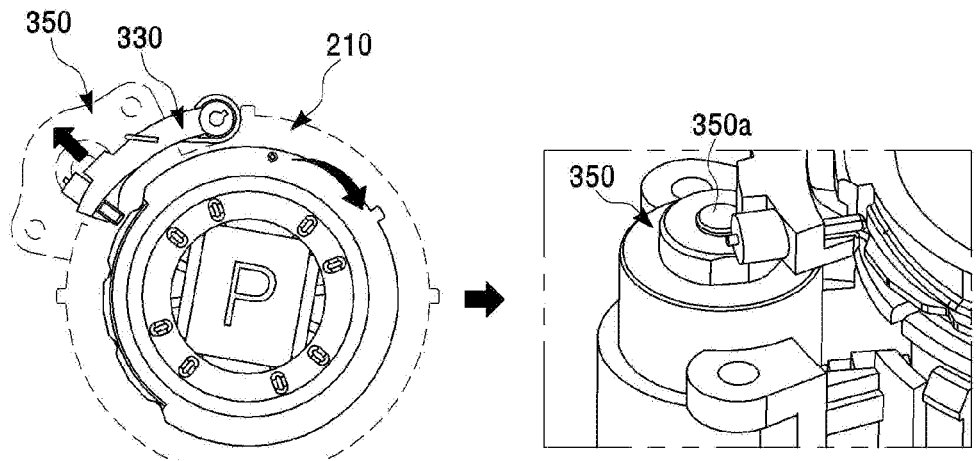
(a)
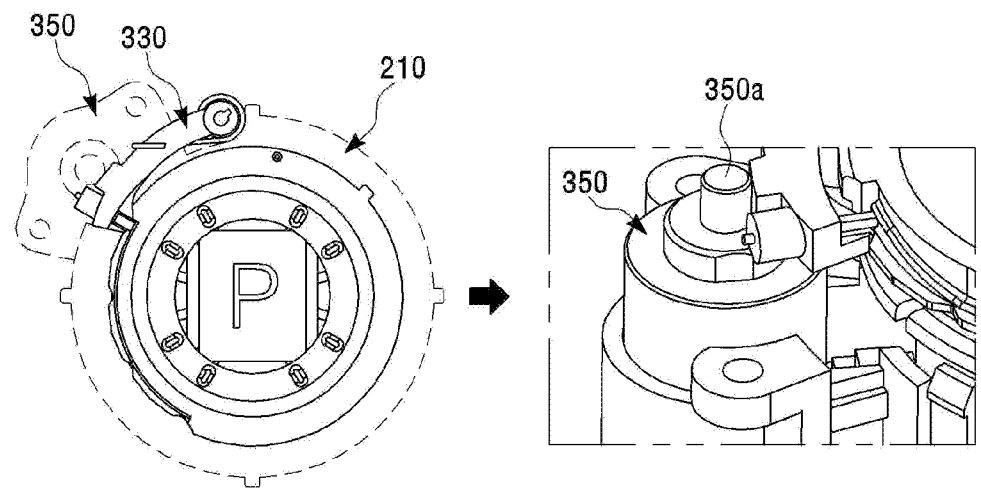
(b)

【Fig. 9】
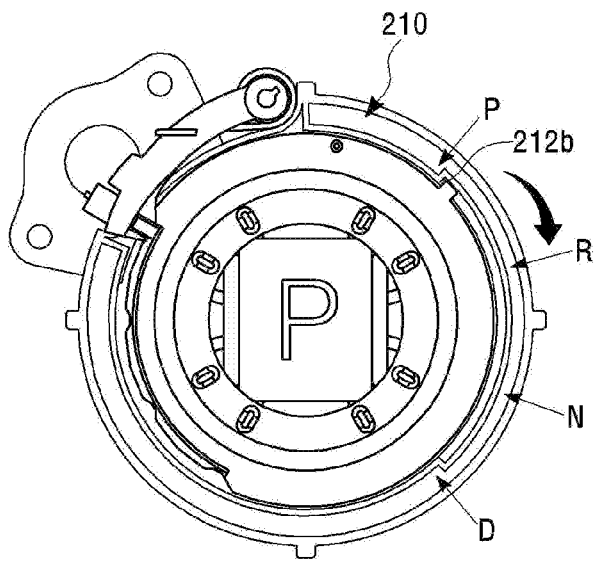
(a)
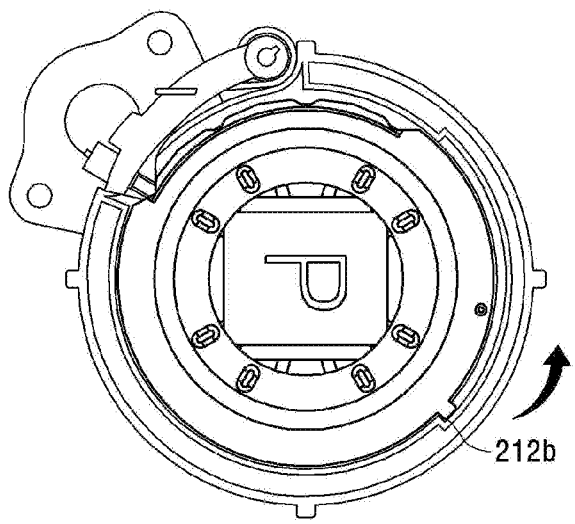
(b)

[Fig. 10]
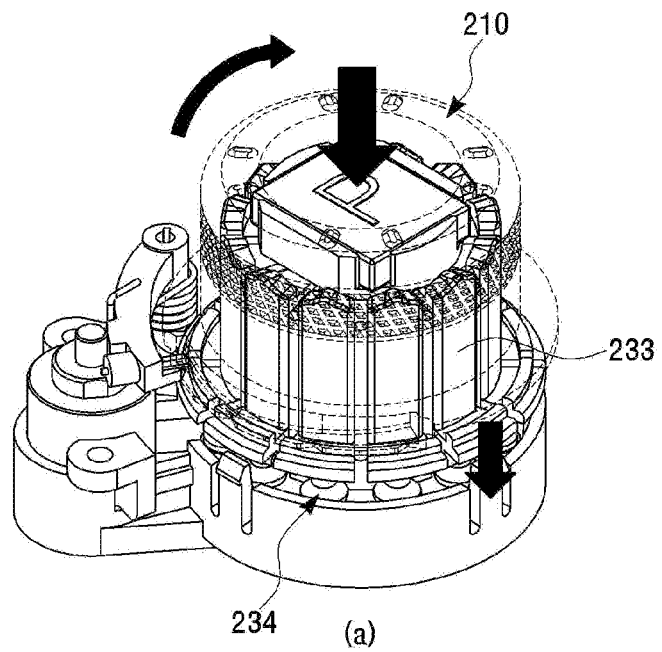
(a)
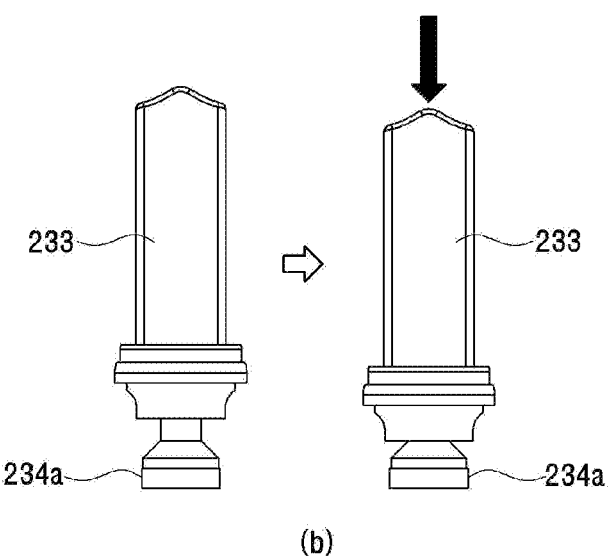
(b)

[Fig. 11]
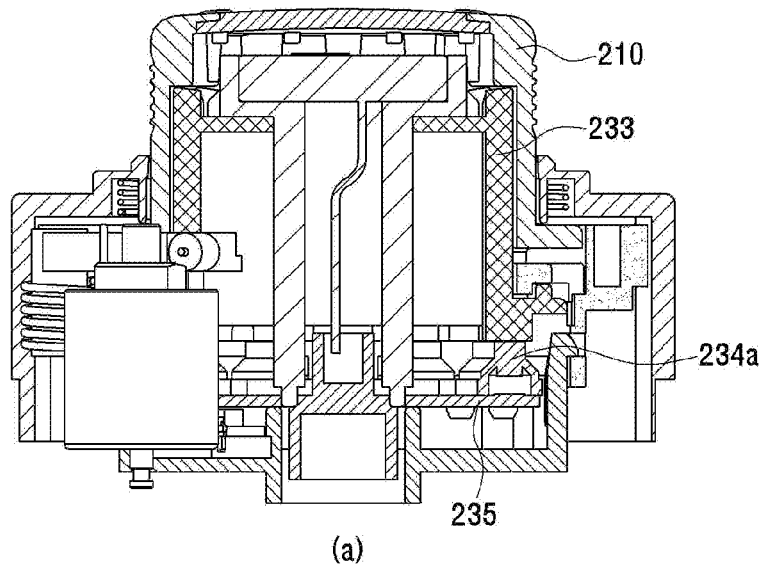
(a)
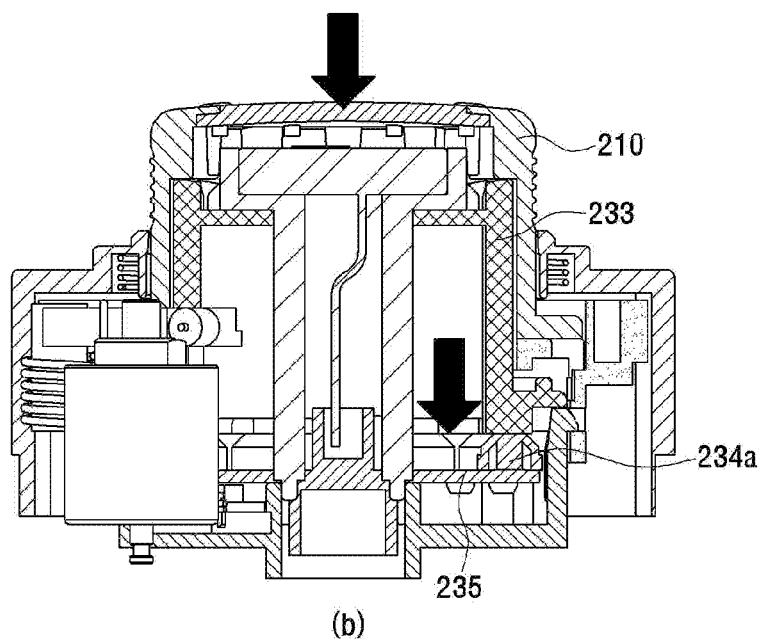
(b)

[Fig. 12]
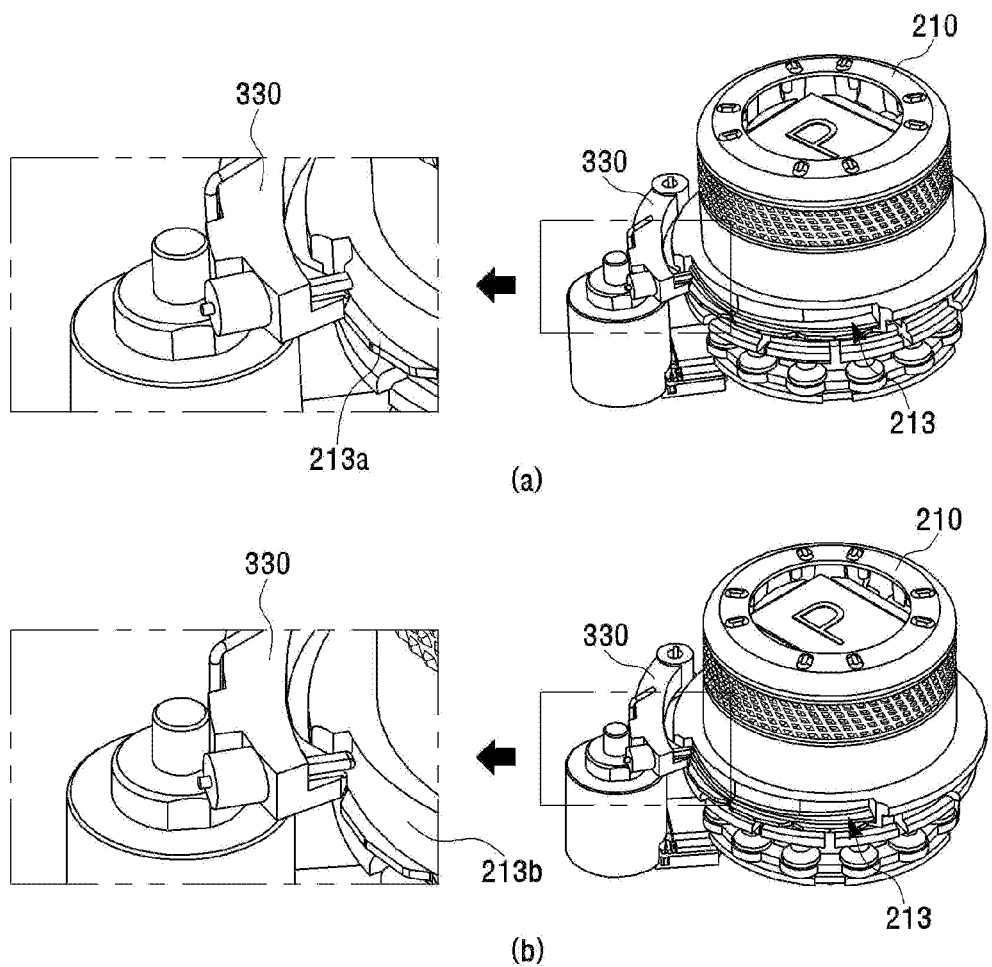

[Fig. 13]
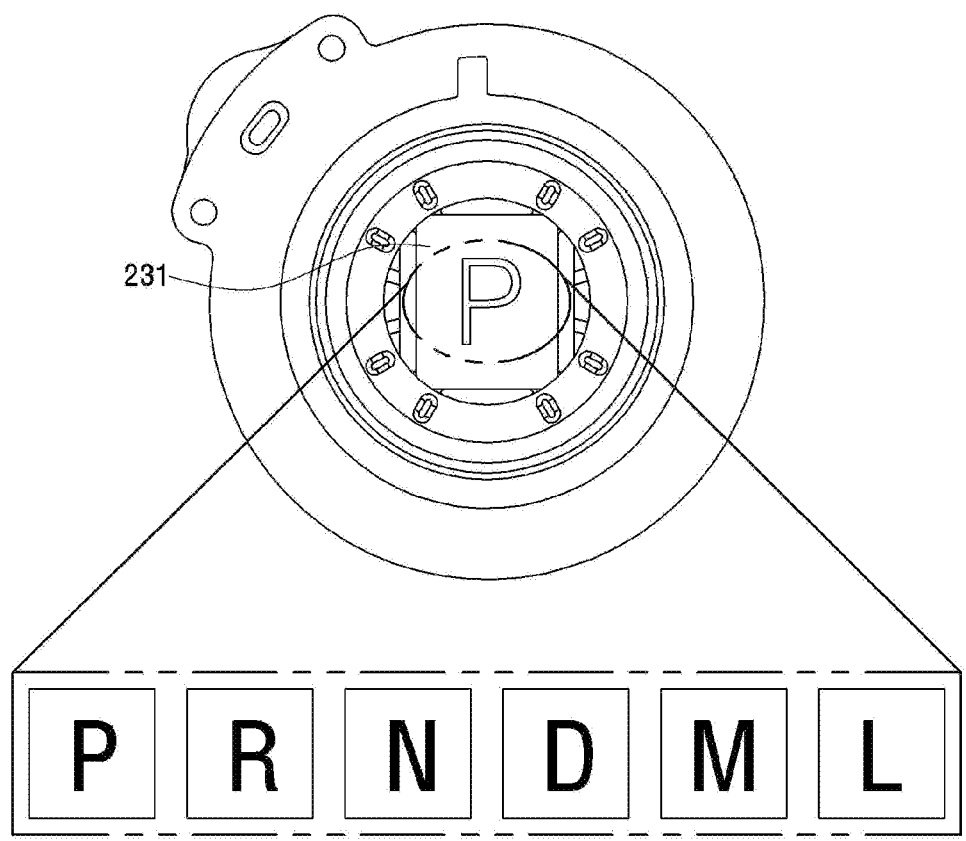

【Fig. 14】
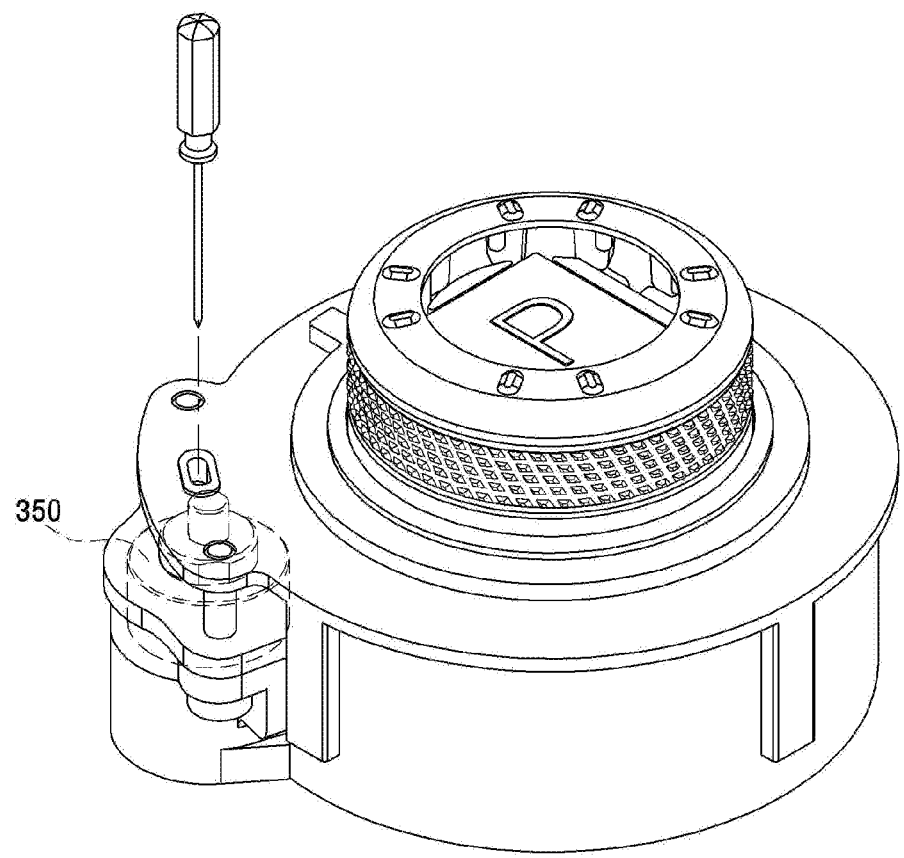

DIAL SHIFT LEVER DEVICE FOR VEHICLE

CROSS-REFERENCE TO RELATED PATENT APPLICATIONS

The present application claims priority to Korean Patent Application No. 10-2018-0097258, filed Aug. 21, 2018. The disclosure of the aforementioned priority application is incorporated herein by reference in its entirety.

BACKGROUND

Field

The present disclosure relates to a shift lever device and more particularly to a dial shift lever device for a vehicle, which allows a shift stage to be selected by converting a rotary motion of a dial knob into a linear motion.

Description of the Related Art

In general, a transmission converts the power generated by an engine into a rotational force required according to the speed of a vehicle and transmits it to the drive wheel. The transmission is divided into a manual transmission and an automatic transmission. A driver who drives a vehicle can change the shift stage of the manual transmission or automatic transmission into a shift stage that the driver wants by manipulating a console side around the driver seat or a shift lever installed on the steering wheel.

The manual transmission is operated in such a way that when a driver selects a gear suitable for the driving condition of the vehicle by using the shift lever, the driver-desired movement is transmitted to the transmission through a cable or rod. The automatic transmission is operated in such a way that the driver moves the shift lever to drive an inhibitor switch through the cable, so that the driver-desired movement is transmitted to the transmission.

Recently, instead of a mechanical shift lever, an electronic shift lever in which a mechanical connection structure between the transmission and the shift lever has been replaced with an electric connection structure through an actuator and ECU are increasingly being used. Unlike the mechanical shift lever, the electronic shift lever has no mechanical cable connection structure and should include a position sensor that converts the shift intention of the driver into an electronic signal. However, the electronic shift lever has excellent lever operation force or excellent operation feeling and is easy to operate.

This electronic shift lever has a stick type, a dial type, a button type, etc. Particularly, the dial type electronic shift lever has a structure in which the driver selects his/her desired shift mode by rotating a knob. In the dial type electronic shift lever, parts for implementing each of the shift stages P/R/N/D of the vehicle are increased and price competitiveness of the product is deteriorated due to the parts management and production problems. Also, functionality, performance, and sensitivity of the product are not easy to satisfy.

PRIOR ART DOCUMENT (Patent Document 1) Korean Patent Application No. 10-2015-0112292 (Oct. 7, 2015)

DISCLOSURE

Technical Problem

The embodiment of the present invention is designed to solve such problems of the prior art. The object of the embodiment of the present invention is to provide a dial shift lever device for a vehicle, which allows a user to select shift stages by changing a rotary motion of a dial knob into a linear motion.

However, the object of the present invention is not limited to the above description and can be variously extended without departing from the scope and spirit of the present invention.

Technical Solution

One embodiment is a dial shift lever device for a vehicle. The dial shift lever device includes: a dial knob which is rotatable from a predetermined reference position by a user's operation for changing a shift stage; a button driving part which comprises a plurality of buttons disposed circumferentially in a receiving recess formed in a lower portion of the dial knob and generates a signal for selecting the shift stage as at least one of the plurality of buttons is pressed by rotation of the dial knob; and a guide assembly which is coupled to the lower portion of the dial knob and locks the rotation of the dial knob or releases the lock of the rotation of the dial knob.

The guide assembly may include: a guide bracket having a first cylindrical coupling recess formed therein; a guide cover which is inserted into and coupled to the first coupling recess and has a coupling hole and a guide groove, the coupling hole which is formed in a center of the guide cover and to which the lower portion of the dial knob is coupled, the guide groove which is formed at a predetermined distance apart from the coupling hole; a solenoid which is coupled to a second coupling recess formed to extend from one side of an outer circumferential surface of the first coupling recess; and a shift lock lever of which one end is axially coupled to a coupling portion formed between the first coupling recess and the second coupling recess and rotates and the other end locks or releases the dial knob in accordance with driving of the solenoid.

The dial knob may be rotatable when the lock of the shift lock lever is released by driving the solenoid in accordance with brake operation of the vehicle.

The dial knob may include: a cylindrical body; a return spring wound on a lower portion of the body; and a wing which extends outward from the lower portion of the body. At least one protrusion which moves along the guide groove is formed on a lower portion of the wing. A catching portion which has a multi-step structure having a first end portion and a second end portion is formed in a portion of the wing, and a plurality of catching grooves by which the shift lock lever is caught every time the shift stage is selected is formed at an end of the second end portion at a predetermined interval.

When the dial knob is pressed vertically by a user's operation, the shift lock lever caught by the catching groove moves to the first end portion and the dial knob may be returned to the reference position by an elastic restoring force of the return spring.

One end of the return spring may be fixed to the wing and the return spring may be wound on the lower portion of the body at least once.

A protrusion which restricts that the dial knob is rotatable within a predetermined range may be formed on one side of the wing.

The button driving part may include: a cylindrical shaft on which a plurality of fixing fins are disposed along the outer circumferential surface thereof by a predetermined distance; a plurality of buttons disposed between the plurality of fixing fins; a plurality of switch rubbers which are disposed under the plurality of buttons respectively and are pressed as at least one of the plurality of buttons descends vertically; and a circuit board which, when the circuit board is disposed under the plurality of switch rubbers and is pressed, generates a signal corresponding to a corresponding shift stage.

The button driving part may further include a display unit which is coupled and fixed to an upper portion of the shaft and displays the shift stage selected by the dial knob.

The circuit board may include a plurality of contact switches disposed under the plurality of switch rubbers respectively. When a lower portion of the pressed switch rubber comes into contact with the contact switch, the corresponding contact switch may be turned on to generate a signal corresponding to a corresponding shift stage.

When all of the plurality of buttons descend vertically as the dial knob is pressed by the user's operation and all of the plurality of switch rubbers are pressed, the circuit board may generate a signal corresponding to a P shift stage.

Advantageous Effects

According to the embodiment of the present invention, every time the dial knob is rotated at a certain angle, one of a plurality of buttons disposed within the dial knob is pressed by a projection formed on the inner upper portion of the dial knob, and a shift stage corresponding to the pressed button is selected, so that the shift stage is selected by changing the rotary motion of the dial knob into the linear motion.

Also, since the shift stage is selected by changing the rotary motion of the dial knob into the linear motion, a smaller number of parts of the product are required. A product gap is small and the product can be smaller.

Also, a corresponding button is pressed by the projection formed on the inner upper portion of the dial knob, and the switch rubber is compressed. Therefore, a user can feel gear shift distinction feeling.

However, the effect of the present invention is not limited to the above description and can be variously extended without departing from the scope and spirit of the present invention.

BRIEF DESCRIPTION OF THE DRAWINGS

FIGS. 1a to 1b are perspective views of a dial shift lever device for a vehicle according to an embodiment of the present invention;

FIG. 2 is an exploded perspective view of the dial shift lever device for a vehicle according to the embodiment of the present invention;

FIG. 3 is a view showing the shape of a dial knob shown in FIG. 2;

FIG. 4 is a view showing the shape of a button driving part shown in FIG. 2;

FIG. 5 is a view showing the detailed configuration of a guide cover shown in FIG. 2;

FIG. 6 is a view showing the shape of a shift lock lever shown in FIG. 2;

FIG. 7 is a view for describing a shift pattern method according to the embodiment of the present invention;

FIG. 8 is a view for describing a shift lock method according to the embodiment of the present invention;

FIG. 9 is a view for describing an over-rotate prevention structure according to the embodiment of the present invention;

FIG. 10 is a view for describing a shift effort generation method according to the embodiment of the present invention;

FIG. 11 is a view for describing a switch contact method according to the embodiment of the present invention;

FIG. 12 is a view for describing a P manual return method according to the embodiment of the present invention;

FIG. 13 is a view for describing a shift stage display method according to the embodiment of the present invention; and FIG. 14 is a view for describing a P manual release method according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a dial shift lever device for a vehicle according to an exemplary embodiment of the present invention will be described with reference to the accompanying drawings. Particularly, the embodiment of the present invention proposes a new structure. According to the new structure, every time a dial knob is rotated at a certain angle, one of a plurality of buttons disposed within the dial knob is pressed by a projection formed on the inner upper portion of the dial knob, so that a shift stage corresponding to the pressed button is selected.

FIGS. 1a to 1b are perspective views of the dial shift lever device for a vehicle according to an embodiment of the present invention. FIG. 2 is an exploded perspective view of the dial shift lever device for a vehicle according to the embodiment of the present invention.

Referring to FIGS. 1a to 1b, the dial shift lever device for a vehicle according to the embodiment of the present invention may include a main body 100, a dial assembly 200, a guide assembly 300, and a controller (not shown).

The main body 100 may be mounted within the vehicle and form a space for receiving various devices for shifting.

The dial assembly 200 may be coupled to the main body 100 and may be rotated or pressed by a rotary motion or a press motion of a user, so that a shift stage, for example, R (Reverse), N (Neutral), and D (Drive) shift stages may be selected.

Referring to FIG. 2, the dial assembly 200 may include a dial knob 210, a return spring 220, and a button driving part 230.

The dial knob 210 is a handle of the user and may be rotated or pressed by user's rotation or pressing operation. The dial knob 210 may be located at a reference position and may be rotated or pressed by a predetermined angle from the reference position. The dial knob 210 may be formed, for example, in a cylindrical shape.

One end of the return spring 220 may be connected to the dial knob 210 and the other end of the return spring 220 may be connected to the inner surface of the main body 100. As the dial knob 210 is rotated, the return spring 220 is compressed, and the dial knob 210 can return to the reference position by an elastic restoring force. For example, when the dial knob 210 is rotationally moved from the reference position by a predetermined angle in order to select the shift stage, the return spring 220 can return the dial knob 210 to the reference position by the elastic restoring force from the position where the dial knob 210 has moved rotationally.

At least one of a plurality of buttons disposed within the dial knob 210 is pressed by the rotation or pressing operation of the dial knob 210, so that the button driving part 230 can generate a signal corresponding to the corresponding shift stage and provide the signal to the controller (not shown).

The guide assembly 300 may support the main body 100 and the dial assembly 200. Referring to FIG. 2, the guide assembly 300 may include a guide cover 310, a guide bracket 320, a shift lock lever 330, a damper bullet 340, and a solenoid 350.

The guide cover 310 may be coupled to the bottom of the button driving part 230 and may guide the rotation of the dial knob 210.

The guide bracket 320 may be supported by being inserted and coupled to the guide cover 310.

One end of the shift lock lever 330 may be axially coupled to the guide bracket 320 and rotated, and the other end of the shift lock lever 330 may perform a function to lock the rotation of the dial knob or to release the lock of the dial knob. A shift lock spring is wound around the end of the shift lock lever 330. The shift lock spring can provide the elastic restoring force in accordance with the rotation of the shift lock lever 330.

The damper bullet 340 is coupled to the other end of the shift lock lever 330. The damper bullet 340 can perform a function to remove noise generated when the other end of the shift lock lever 300 contacts the dial knob, or to absorb the impact caused when the other end of the shift lock lever 300 contacts the dial knob.

The solenoid 350 may be driven while being coupled to the guide bracket 320. Here, the solenoid 350 may be driven in conjunction with a brake operation signal. The solenoid 350 is driven in accordance with the brake operation signal, thereby controlling the driving of the shift lock lever 330, that is, the locked or released state of the shift lock lever.

The controller (not shown) may transmit a signal provided from the dial assembly 200, for example, shift stage information based on R, N, and D to a control device of an automatic transmission of the vehicle.

FIG. 3 is a view showing the shape of the dial knob shown in FIG. 2.

Referring to (a) to (b) of FIG. 3, the dial knob 210 according to the embodiment of the present invention may include a cylindrical body 211 and a wing 212 formed to extend vertically outward from the lower portion of the body 211.

The body 211 may be formed in a cylindrical shape. An opening 211a may be formed on the top surface of the body 211. A receiving recess 211b capable of receiving the button driving part may be formed in the lower portion of the body 211.

A plurality of first protrusions 211c may be formed on the upper portion of the receiving recess 211b at a predetermined interval. A second protrusion 211d may be formed between at least one pair of adjacent first protrusions 211c. Here, the length of the first protrusion 211c may be less than the length of the second protrusion 211d. The second protrusion 211d may include at least one projection. In this specification, an example of including two projections will be described. The number or the shape of the projections may vary according to the shape of the button.

Here, the first protrusion 211c may be formed in order that all the buttons constituting the button driving part are pressed, when the dial knob is pressed. The second protrusion 211d may be formed in order that a button for selecting a specific shift stage among the plurality of the buttons constituting the button driving part is pressed, when the dial knob is rotated. Since the second protrusion 211d rides over the upper portion of the button every time the dial knob is rotated, an operation force may be generated.

Here, one second protrusion 211d may be provided, and then one button may be pressed. Also, two or more second protrusions 211d may be provided, and then two or more buttons may be pressed at the same time.

The wing 212 is formed to extend outward from the lower portion of the body 211. A catching portion 213 may be formed in a portion of the wing. The catching portion 213 has a multi-step structure having a first end portion 213b and a second end portion 213a lower than the first end portion 213b. A plurality of catching grooves G1, G2, G3, and G4 by which the shift lock lever is caught every time different shift stages are selected may be formed at the end of the second end portion 213a at a predetermined interval. Here, the catching groove is described by taking an example of a case where four shift stages of P, R, N, and D are provided. However, the embodiment of the invention is not limited to this.

Here, a protruding section for assisting the rotation of the shift lock lever may be formed at the first end portion 213b when the shift lock lever is returned to the P shift stage by the return spring.

FIG. 4 is a view showing the shape of the button driving part shown in FIG. 2.

As shown in FIG. 4, the button driving part 230 according to the embodiment of the present invention may include a display unit 231, a shaft 232, a button part 233, a switch rubber 234, and a circuit board 235.

The display unit 231 may display the shift stage information by user's shift operation. A connection terminal 231a for transmitting a signal may be formed under the display unit 231.

The shaft 232 is a body portion of the button driving part. A seating part 232a on which the display unit is seated is formed on the upper portion of the shaft 232. A connection hole 232b into which the connection terminal 231a of the display unit 231 is inserted is formed in the middle portion of the seating part 232a. Also, a plurality of fixing fins 232c for fixing the button may be formed to be spaced apart from each other by a predetermined distance on the outer circumferential surface of the shaft 232 in the outer circumferential direction of the shaft 232. Since the horizontal section of the shaft 232 is circular, the plurality of fixing fins formed on the outer circumferential surface may be formed in a radial direction.

The button part 233 may include the plurality of buttons disposed between the plurality of fixing fins 232c formed on the outer circumferential surface of the shaft 232. The plurality of buttons may be formed in the same shape, and the middle of the upper portion of the button may be formed convex.

A plurality of rubbers of the switch rubber 234 are connected to each other to form a ring. The switch rubber 234 is disposed under the button part 233, so that a corresponding rubber may be pressed by a descending button.

The circuit board 235 is disposed under the switch rubber 234. A contact switch 235b which is switched by the pressed rubber 234a is disposed. The contact switch 235b is turned on to generate and output a signal for selecting a corresponding shift stage.

FIG. 5 is a view showing the detailed configuration of the guide cover shown in FIG. 2.

Referring to FIG. 5, the guide cover 310 according to the embodiment of the present invention may include a body 311, a guide groove 312, guide ends 313a and 313b, and a protrusion 314.

A cylindrical coupling hole 311a is formed in the center of the body 311, and a support 311b extending inwardly by a predetermined length may be formed on the inner circumferential surface of the coupling hole 311a. The dial knob may be disposed and supported on the support 311b, and the button driving part in interworking with the dial knob may be disposed under the support 311b.

A catching portion 213 of the dial knob 210 is inserted into and coupled to the guide groove 312. The guide groove 312 may be formed such that the catching portion 213 of the dial knob 210 can rotationally move only in a predetermined section.

A protrusion 212b formed on the wing 212 of the dial knob 210 may be caught by the guide ends 313a and 313b. The guide ends 313a and 313b, together with the guide groove 312, restrict the rotation section of the dial knob 210.

The protrusion 314 is formed on one side of the body 311 and has a coupling hole 314a formed in the central portion thereof. The upper portion of the solenoid 350 may be inserted into and coupled to the coupling hole 314a.

FIG. 6 is a view showing the shape of the shift lock lever shown in FIG. 2.

Referring to FIG. 6, the shift lock lever 330 according to the embodiment of the present invention may include a rotating portion 330a, a coupling portion 330b, a protrusion 330c, a receiving portion 330d, a shift lock spring 330e.

The rotating portion 330a may be formed in the form of a circular arc. The coupling portion 330b may be formed to extend vertically from one end of the rotating portion 330a. The protrusion 330c which is caught by the catching groove of the dial knob may be formed on the lower portion of the other end of the rotating portion 330a. The receiving portion 330d which receives the damper bullet may be formed on the upper portion of the other end of the rotating portion 330a.

The coupling portion 330b is axially coupled to the guide bracket and can rotate about the axis.

The shift lock spring 330e is wound on the outer circumferential surface of the coupling portion 330b. One end of the shift lock spring 330e is coupled to the rotating portion 330a to provide an elastic restoring force in accordance with the rotation of the coupling portion. That is, even if the shift lock lever 330 rotationally moves in accordance with the rotation of the dial knob in a released state, the shift lock spring 330e can cause the shift lock lever 330 to return to the dial knob direction.

FIG. 7 is a view for describing a shift pattern method according to the embodiment of the present invention.

Referring to FIG. 7, the shift pattern system using a rotating manner and a pressing manner is applied to the dial shift lever device according to the embodiment of the present invention. The shift stage may be selected by rotating the dial knob by a predetermined angle, or alternatively, a P shift stage may be selected by pressing the dial knob.

Referring to (a) of FIG. 7, the dial knob is rotated by a predetermined angle. Here, at the position where the dial knob has been rotated, the button is pressed by at least one protrusion formed in the receiving recess of the dial knob. As a result, a corresponding shift stage may be selected. For example, when the dial knob is located at the reference position, the P shift stage may be selected, when the dial knob is rotated by 30 degrees, the R shift stage may be selected, when the dial knob is rotated by 60 degrees, the N shift stage may be selected, and when the dial knob is rotated by 90 degrees, the D shift stage may be selected. Here, the case where the rotation angle is 30 degrees has been described as an example. However, the embodiment of the present invention is not limited to this, and various angles can be applied.

Referring to FIG. 7 (b), when the dial knob is pressed, the button is pressed by all of the protrusions formed in the receiving recess of the dial knob, so that the P shift stage may be selected.

For example, as shown in (c) of FIG. 7, the shift pattern according to the embodiment of the present invention may be implemented as a button-type P shift stage and rotation-type four P, R, N, and D shift stages.

For another example, as shown in (d) of FIG. 7, the shift pattern according to the embodiment of the present invention may be implemented as a button-type P shift stage and rotation-type four R, N, D, and M shift stages.

For further another example, as shown in (e) of FIG. 7, the shift pattern according to the embodiment of the present invention may be implemented as a button-type P shift stage and rotation-type four P, R, N, D, and L shift stages.

FIG. 8 is a view for describing a shift lock method according to the embodiment of the present invention.

Referring to FIG. 8, a shift lock method is applied to the dial shift lever device according to the embodiment of the present invention. The solenoid 350 is operated in conjunction with the brake operation signal, so that the shift lock lever 330 may be in a locked state or in a released state.

For example, when there is the brake operation signal as shown in (a) of FIG. 8, the solenoid 350 is operated to move down a driving part 350a of the solenoid 350, so that the shift lock lever 330 enters the released state. As a result, the rotation operation of the dial knob 210 can be freely performed.

For another example, when there is no brake operation signal as shown in (b) of FIG. 8, the driving part 350a of the solenoid 350 returns to its original position, so that the shift lock lever 330 enters the locked state and the rotation operation of the dial node 210 may be impossible.

As described above, in the embodiment of the present invention, the solenoid can control the shift lock lever.

FIG. 9 is a view for describing an over-rotate prevention structure according to the embodiment of the present invention.

Referring to FIG. 9, the over-rotate prevention structure is applied to the dial shift lever device according to the embodiment of the present invention. The dial knob may be designed to be rotatable only in a predetermined rotation section. That is, since the protrusion 212b formed on the wing of the dial knob is caught by two guide ends formed on the guide cover, the dial knob may be designed to be rotatable only between the two guide ends.

For example, when the dial knob selects the shift stage in the order of P-R-N-D, the protrusion 212b of the dial knob is, as shown in (a) of FIG. 9, caught at the P shift stage by the guide end of the guide cover, so that the dial knob may not be able to rotate counterclockwise. Also, the protrusion 212b of the dial knob is, as shown in (b) of FIG. 9, caught at the D shift stage by the guide end of the guide cover, so that the dial knob may not be able to rotate clockwise.

FIG. 10 is a view for describing a shift effort generation method according to the embodiment of the present invention.

Referring to FIG. 10, the shift effort generation method is applied to the dial shift lever device according to the embodiment of the present invention. The dial knob 210 is rotated by a predetermined angle. Here, at the position where the dial knob has been rotated, the button 233 is pressed by the protrusion formed on the inner upper portion of the receiving recess of the dial knob. Then, a corresponding rubber 234a of the switch rubber may be compressed by the pressed button.

As such, in the embodiment of the present invention, when the dial node is rotated or pressed to select the shift stage, the button is pressed and the switch rubber is compressed, so that the operation force may be generated.

FIG. 11 is a view for describing a switch contact method according to the embodiment of the present invention.

Referring to FIG. 11, the switch contact method is applied to the dial shift lever device according to the embodiment of the present invention. The button 233 is pressed by the dial knob 210, and the rubber 234a is compressed by the pressed button and then comes into contact with the contact switch within the circuit board 235.

As such, in the embodiment of the present invention, the switch rubber is brought into contact with the contact switch of the circuit board by converting the rotary motion of the dial knob into a linear motion through the button, so that the contact switch is turned on to generate a corresponding shift stage signal.

FIG. 12 is a view for describing a P manual return method according to the embodiment of the present invention.

Referring to FIG. 12, the P manual return method is applied to the dial shift lever device according to the embodiment of the present invention. The shift lock lever 330 is separated from the catching groove of the dial knob 210 by pressing the dial knob 210, so that the dial knob 210 can return manually to the P shift stage.

That is, when the user presses the dial knob 210 regardless of a current shift stage, the shift lock lever 330 is separated from the catching groove of the dial knob 210 and moves to the catching portion 213 and is seated. Since the shift lock lever 330 is not caught by anywhere on the catching portion 213, the dial knob 210 can be returned to the reference position, that is, the P shift stage by the elastic restoring force of the return spring.

Here, assuming that the load of the shift lock spring of the shift lock lever is F1 and the load of the return spring of the dial knob is F2, F2 is greater than F1, and thus, the dial knob can be manually returned.

FIG. 13 is a view for describing a shift stage display method according to the embodiment of the present invention.

Referring to FIG. 13, the shift stage display method is applied to the dial shift lever device according to the embodiment of the present invention. A selected shift stage can be displayed on the display unit. For example, the display unit can display the P shift stage, the R shift stage, the N shift stage, the D shift stage, the M shift stage, and the L shift stage.

FIG. 14 is a view for describing a P manual release method according to the embodiment of the present invention.

Referring to FIG. 14, the P manual release method is applied to the dial shift lever device according to the embodiment of the present invention. The user moves forcibly down the protrusion of the solenoid 350 by using a tool, thereby releasing the lock of the shift lock lever, and the P shift stage can be released.

After releasing the P shift stage, the shift lock lever can be returned by using the elastic restoring force of the shift lock spring.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

REFERENCE NUMERALS

100: main body
200: dial assembly
210: dial knob
220: return spring
230: button driving part
300: guide assembly
310: guide cover
320: guide bracket

What is claimed is:

1. A dial shift lever device for a vehicle, the dial shift lever device comprising:
a dial knob which is rotatable from a predetermined reference position by a user's operation for changing a shift stage;
a button driving part which comprises a plurality of buttons disposed circumferentially in a receiving recess formed in a lower portion of the dial knob and generates a signal for selecting the shift stage as at least one of the plurality of buttons is pressed by rotation of the dial knob; and
a guide assembly which is coupled to the lower portion of the dial knob and locks the rotation of the dial knob or releases the lock of the rotation of the dial knob.

2. The dial shift lever device for a vehicle of claim 1, wherein the guide assembly comprises:
- a guide bracket having a first cylindrical coupling recess formed therein;
- a guide cover which is inserted into and coupled to the first coupling recess and has a coupling hole and a guide groove, the coupling hole which is formed in a center of the guide cover and to which the lower portion of the dial knob is coupled, the guide groove which is formed at a predetermined distance apart from the coupling hole;
- a solenoid which is coupled to a second coupling recess formed to extend from one side of an outer circumferential surface of the first coupling recess; and
- a shift lock lever of which one end is axially coupled to a coupling portion formed between the first coupling recess and the second coupling recess and rotates and the other end locks or releases the dial knob in accordance with driving of the solenoid.

3. The dial shift lever device for a vehicle of claim 2, wherein the dial knob is rotatable when the lock of the shift lock lever is released by driving the solenoid in accordance with brake operation of the vehicle.

4. The dial shift lever device for a vehicle of claim 3, wherein the dial knob comprises:
- a cylindrical body;
- a return spring wound on a lower portion of the body; and
- a wing which extends outward from the lower portion of the body,
  - wherein at least one protrusion which moves along the guide groove is formed on a lower portion of the wing,
  - and wherein a catching portion which has a multi-step structure having a first end portion and a second end portion is formed in a portion of the wing, and a plurality of catching grooves by which the shift lock lever is caught every time the shift stage is selected is formed at an end of the second end portion at a predetermined interval.

5. The dial shift lever device for a vehicle of claim 4, wherein, when the dial knob is pressed vertically by a user's operation, the shift lock lever caught by the catching groove moves to the first end portion and the dial knob is returned to the reference position by an elastic restoring force of the return spring.

6. The dial shift lever device for a vehicle of claim 5, wherein one end of the return spring is fixed to the wing and the return spring is wound on the lower portion of the body at least once.

7. The dial shift lever device for a vehicle of claim 4, wherein a protrusion restricting rotation of the dial knob within a predetermined range is formed on one side of the wing.

8. The dial shift lever device for a vehicle of claim 1, wherein the button driving part comprises:
- a cylindrical shaft on which a plurality of fixing fins are disposed along the outer circumferential surface thereof by a predetermined distance;
- a plurality of buttons disposed between the plurality of fixing fins;
- a plurality of switch rubbers which are disposed under the plurality of buttons respectively and are pressed as at least one of the plurality of buttons descends vertically; and
- a circuit board which, when the circuit board is disposed under the plurality of switch rubbers and is pressed, generates a signal corresponding to a corresponding shift stage.

9. The dial shift lever device for a vehicle of claim 8, wherein the button driving part further comprises a display unit which is coupled and fixed to an upper portion of the shaft and displays the shift stage selected by the dial knob.

10. The dial shift lever device for a vehicle of claim 8, wherein the circuit board comprises a plurality of contact switches disposed under the plurality of switch rubbers respectively, and wherein, when a lower portion of the pressed switch rubber comes into contact with the contact switch, the corresponding contact switch is turned on to generate a signal corresponding to a corresponding shift stage.

11. The dial shift lever device for a vehicle of claim 6, wherein, when all of the plurality of buttons descend vertically as the dial knob is pressed by the user's operation and all of the plurality of switch rubbers are pressed, the circuit board generates a signal corresponding to a P shift stage.

* * * * *